(12) United States Patent
Signaoff et al.

(10) Patent No.: US 7,773,588 B2
(45) Date of Patent: Aug. 10, 2010

(54) SYSTEM AND METHOD FOR CROSS PROTOCOL COMMUNICATION

(75) Inventors: Christopher S. Signaoff, Hutto, TX (US); Tom W. Opsahl, Flower Mound, TX (US); Edward M. Riley, III, Flower Mound, TX (US); Justin S. Signaoff, Round Rock, TX (US)

(73) Assignee: directPacket Research, Inc., Irving, TX (US)

( * ) Notice: Subject to any disclaimer, the term of this patent is extended or adjusted under 35 U.S.C. 154(b) by 579 days.

(21) Appl. No.: 11/403,552

(22) Filed: Apr. 13, 2006

(65) Prior Publication Data

US 2007/0242694 A1  Oct. 18, 2007

(51) Int. Cl.
- H04L 12/66  (2006.01)
- H04L 12/56  (2006.01)
- H04J 3/22   (2006.01)
- G06F 15/16  (2006.01)

(52) U.S. Cl. .................. 370/356; 370/401; 370/467; 709/227

(58) Field of Classification Search ......... 370/352–356, 370/401–408, 466–467; 709/227–228
See application file for complete search history.

(56) References Cited

U.S. PATENT DOCUMENTS

| | | | |
|---|---|---|---|
| 6,047,320 A | 4/2000 | Tezuka et al. | |
| 6,266,809 B1 | 7/2001 | Craig et al. | |
| 6,380,968 B1 | 4/2002 | Alexander et al. | |
| 6,434,140 B1 * | 8/2002 | Barany et al. | 370/352 |
| 6,611,503 B1 | 8/2003 | Fitzgerald et al. | |
| 6,614,465 B2 | 9/2003 | Alexander et al. | |
| 6,633,324 B2 | 10/2003 | Stephens, Jr. | |
| 6,633,985 B2 | 10/2003 | Drell | |
| 6,735,626 B1 | 5/2004 | Tezuka et al. | |
| 6,795,444 B1 | 9/2004 | Vo et al. | |
| 6,798,782 B1 | 9/2004 | Caronni et al. | |
| 6,963,583 B1 * | 11/2005 | Foti | 370/467 |
| 7,016,935 B2 | 3/2006 | Lee et al. | |
| 7,020,130 B2 | 3/2006 | Krause et al. | |
| 7,023,465 B2 | 4/2006 | Stephens, Jr. | |
| 7,031,341 B2 | 4/2006 | Yu | |
| 7,039,701 B2 | 5/2006 | Wesley | |
| 7,159,036 B2 | 1/2007 | Hinchliffe et al. | |

(Continued)

OTHER PUBLICATIONS

International Search Report and Written Opinion issued for PCT/US07/66457 dated Jun. 17, 2008, 10 pgs.

(Continued)

*Primary Examiner*—Tri H Phan
(74) *Attorney, Agent, or Firm*—Fulbright & Jaworski L.L.P.

(57) ABSTRACT

A multimedia communication system and method are described where a communication controller receives a multimedia data stream from a communication device in a first protocol. The controller detects a type of the first protocol, such as text-based protocol or a binary protocol and then converts the first protocol into an intermediate protocol. The multimedia data stream in this intermediate protocol is then transmitted to a second communication controller connected to the destination communication device. The multimedia data stream is then converted at the second communication controller from the intermediate protocol into a second protocol which is then used to transmit the multimedia data stream to the destination communication device.

23 Claims, 7 Drawing Sheets

U.S. PATENT DOCUMENTS

| | | | |
|---|---|---|---|
| 7,177,929 | B2 | 2/2007 | Burbeck et al. |
| 7,181,530 | B1 | 2/2007 | Halasz et al. |
| 7,194,526 | B2 | 3/2007 | Kanemitsu |
| 7,206,808 | B2 | 4/2007 | Babka et al. |
| 7,251,689 | B2 | 7/2007 | Wesley |
| 7,293,169 | B1 | 11/2007 | Righi et al. |
| 7,328,406 | B2 | 2/2008 | Kalinoski et al. |
| 7,346,076 | B1 * | 3/2008 | Habiby et al. ............... 370/466 |
| 7,346,912 | B2 | 3/2008 | Seebaldt |
| 7,353,380 | B2 | 4/2008 | VanHeyningen |
| 7,363,381 | B2 | 4/2008 | Mussman et al. |
| 7,370,097 | B2 | 5/2008 | Hashimoto |
| 7,372,957 | B2 | 5/2008 | Strathmeyer et al. |
| 7,385,622 | B2 | 6/2008 | Babka et al. |
| 7,436,428 | B2 | 10/2008 | Schrader et al. |
| 7,441,270 | B1 | 10/2008 | Edwards et al. |
| 2003/0065737 | A1 | 4/2003 | Aasman |
| 2003/0081783 | A1 | 5/2003 | Adusumilli et al. |
| 2003/0182451 | A1 | 9/2003 | Grass et al. |
| 2003/0227908 | A1 * | 12/2003 | Scoggins et al. ............ 370/352 |
| 2003/0232648 | A1 | 12/2003 | Prindle |
| 2004/0037268 | A1 | 2/2004 | Read |
| 2004/0158606 | A1 | 8/2004 | Tsai |
| 2005/0021610 | A1 | 1/2005 | Bozionek et al. |
| 2005/0080919 | A1 | 4/2005 | Li et al. |
| 2005/0122964 | A1 | 6/2005 | Strathmeyer et al. |
| 2005/0125696 | A1 * | 6/2005 | Afshar et al. ............... 713/201 |
| 2005/0243747 | A1 * | 11/2005 | Rudolph ..................... 370/282 |
| 2005/0259145 | A1 | 11/2005 | Schrader et al. |
| 2005/0271051 | A1 | 12/2005 | Holloway et al. |
| 2006/0098684 | A1 * | 5/2006 | Bozionek et al. ............ 370/466 |
| 2006/0104288 | A1 | 5/2006 | Yim et al. |
| 2006/0109862 | A1 | 5/2006 | Choi et al. |
| 2006/0187903 | A1 * | 8/2006 | Kallio et al. ................ 370/352 |
| 2006/0190719 | A1 | 8/2006 | Rao et al. |
| 2006/0224883 | A1 | 10/2006 | Khosravi et al. |
| 2007/0005804 | A1 | 1/2007 | Rideout |
| 2007/0022201 | A1 | 1/2007 | Aaby et al. |
| 2007/0036143 | A1 | 2/2007 | Alt et al. |
| 2007/0239841 | A1 | 10/2007 | Lehrman |
| 2007/0242696 | A1 | 10/2007 | Signaoff et al. |
| 2008/0043091 | A1 | 2/2008 | Lia et al. |
| 2008/0134200 | A1 | 6/2008 | Seebaldt |
| 2008/0235362 | A1 | 9/2008 | Kjesbu et al. |
| 2009/0051752 | A1 | 2/2009 | Lammers |
| 2009/0112671 | A1 | 4/2009 | Grodum |

OTHER PUBLICATIONS

International Search Report and Written Opinion issued for PCT/US2007/066435; Dated: Apr. 2, 2008; 9 Pages.

International Search Report and Written Opinion issued for PCT/US2007/066451; Dated: Jul. 7, 2008; 11 Pages.

International Search Report and Written Opinion issued for PCT/US2007/066460; Dated: Apr. 9, 2008; 10 Pages.

* cited by examiner

SYSTEM AND METHOD FOR CROSS PROTOCOL COMMUNICATION

TECHNICAL FIELD

The present invention is related to electronic communications systems and, more particularly, to communication using incompatible communication protocols.

BACKGROUND OF THE INVENTION

The Internet may be used for many forms of communication, including voice conversations, video conferencing, development collaboration, and the like. In order for a manufacturers' programs, applications, equipment, and systems to be interoperable with each other, many protocols have been developed to standardize the communication between such systems. These protocols have grown increasingly complex to handle all the types of traffic generated to facilitate communication for video conferencing, voice over Internet Protocol (VoIP), and data over Internet Protocol applications. Two examples of such protocols that have been defined for handling the administration of VoIP, and its natural extension to multimedia communication are H.323 from the International Telecommunication Union-Telecommunication Standardization Sector (ITU-T) and the Session Initiation Protocol (SIP) from the Internet Engineering Task Force (IETF). Both H.323 and SIP typically allow for multimedia communication including voice, video, and data communications in real-time.

H.323 and SIP, in addition to other such communication protocols, each rely on multiple other protocols, some of which may in turn rely on UDP for sending and receiving multimedia traffic. UDP features minimal overhead compared to other transport protocols (most notably TCP) at the expense of having less reliability. UDP does not provide for guaranteed packet delivery nor data integrity. UDP does offer the highest possible throughput, thus, making it ideally suited for multimedia real-time communications.

While these different protocols, such as H.323 and SIP, each facilitate the multimedia communication, they are quite different in structure and format. Some protocols, such as H.323, are binary format protocols. That means the transmitted information in the H.323 stream is in a binary coded format. In contrast, other protocols, such as SIP, are text-based protocols, which means that text tags or other information are included in the transmitted streams. Multimedia communication systems, therefore, are typically designed to be implemented in one of the various protocols. For example, one communication system may be designed to operate with H.323, while others might be designed to operate with SIP, VoIP, or the like.

A problem arises when a party using an H.323 endpoint on one communication system designed to use H.323 desires to communicate with another party using a different protocol endpoint on another communication system designed for the different protocol. Because the two systems and endpoints use incompatible protocols, communication cannot be established between the two parties by connecting the first endpoint and system with the target endpoint and system. The two endpoints and systems speak different languages and, thus, cannot understand the messaging and data being transmitted by the other. As the popularity of Internet-based or electronic multimedia communications grows, a likelihood exists that this problem may be encountered with increasing frequency.

BRIEF SUMMARY OF THE INVENTION

The present invention is directed to a system and method for facilitating multimedia communication with multiple communication protocols. A communication controller within the system receives a multimedia data stream in a first protocol from a communication device. The controller detects a type of the first protocol, such as text-based protocol or a binary protocol, and converts the first protocol into an intermediate protocol. The intermediate protocol may be created to reflect the commonalities between the various communication protocols that are expected within the system. The multimedia data stream in this intermediate protocol is then transmitted to a second communication controller connected to the target communication device. The second communication controller converts the multimedia data stream in the intermediate protocol into a second protocol that is compatible with the destination communication device. Prior to making this conversion, the second communication controller would determine what protocol this destination device uses. The multimedia data stream in this second protocol is then transmitted to the destination communication device. By providing the interim or intermediate protocol, translation or conversion between the different protocols is quick and efficient. Moreover, it allows communication devices that use different communication protocols to participate in multimedia communications on the same system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1A:
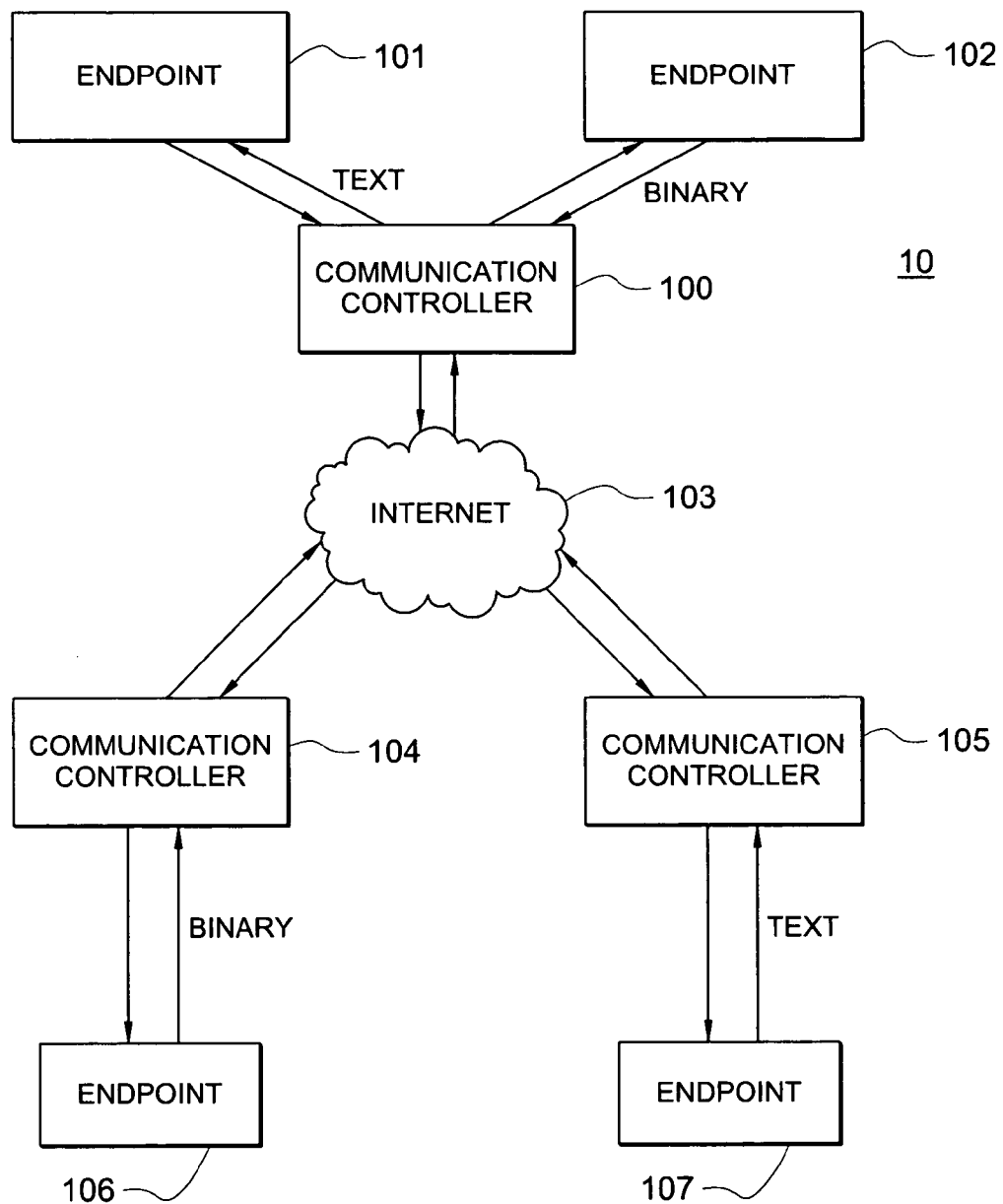
FIG. 1A is a block diagram illustrating a multimedia communication network configured according to one embodiment of the present invention.

FIG. 1A is a block diagram illustrating multimedia communication network 10 configured according to one embodiment of the present invention. Multimedia communication network 10 includes communication controller 100 connected to endpoints 101 and 102. Communication controller 100 is also connected to Internet 103 to facilitate connections with communication controllers 104 and 105, and endpoints 106 and 107. A major difference between multimedia communication network 10 and other existing communication networks is that endpoints 101-102 and 106-107 communicate using different communication protocols.

Endpoints 101 and 107 each use a text-based communication protocol, such as SIP, while endpoints 102 and 106 each use a binary communication protocol, such as H.323. SIP and H.323 are merely specific examples of text-based and binary protocols. Other protocols may be used as well. Because the binary communication protocol is incompatible with the text-based protocol, endpoint 101 cannot directly communicate with endpoint 102 simply by sending its communication stream to endpoint 102. Instead, communication controller 100 receives the multimedia communication stream from endpoint 101 in the text-based protocol and converts it line-by-line into an interim protocol that comprises the common functions and elements of the different protocols. Communication controller 100 then converts the interim protocol into the binary protocol for transmission to endpoint 102.

In implementing multimedia communication between multiple endpoints connected at various remote locations with different communication controllers, the transmitting communication controller translates the text-based or binary communication protocol into an interim or intermediate communication protocol that simplifies the protocol signals into their common elements. This intermediate communication protocol may be efficiently transmitted across Internet 103 to either or both of communication controllers 104 and 105. Once received at communication controllers 104 and 105, the intermediate communication protocol is then converted into the appropriate communication protocol for delivery to endpoints 106 and 107 (i.e., binary for endpoint 106 and text-based for endpoint 107). This conversion process, thus, allows multiple endpoints that communicate using different communication protocols to communicate effectively within the single multimedia communication system 10.

It should be noted that in additional and alternative embodiments of the present invention, any different type of communication protocol may be used by the various endpoints. Moreover, the communication controllers may be configured to service any number of different endpoints.

Figure 1B:
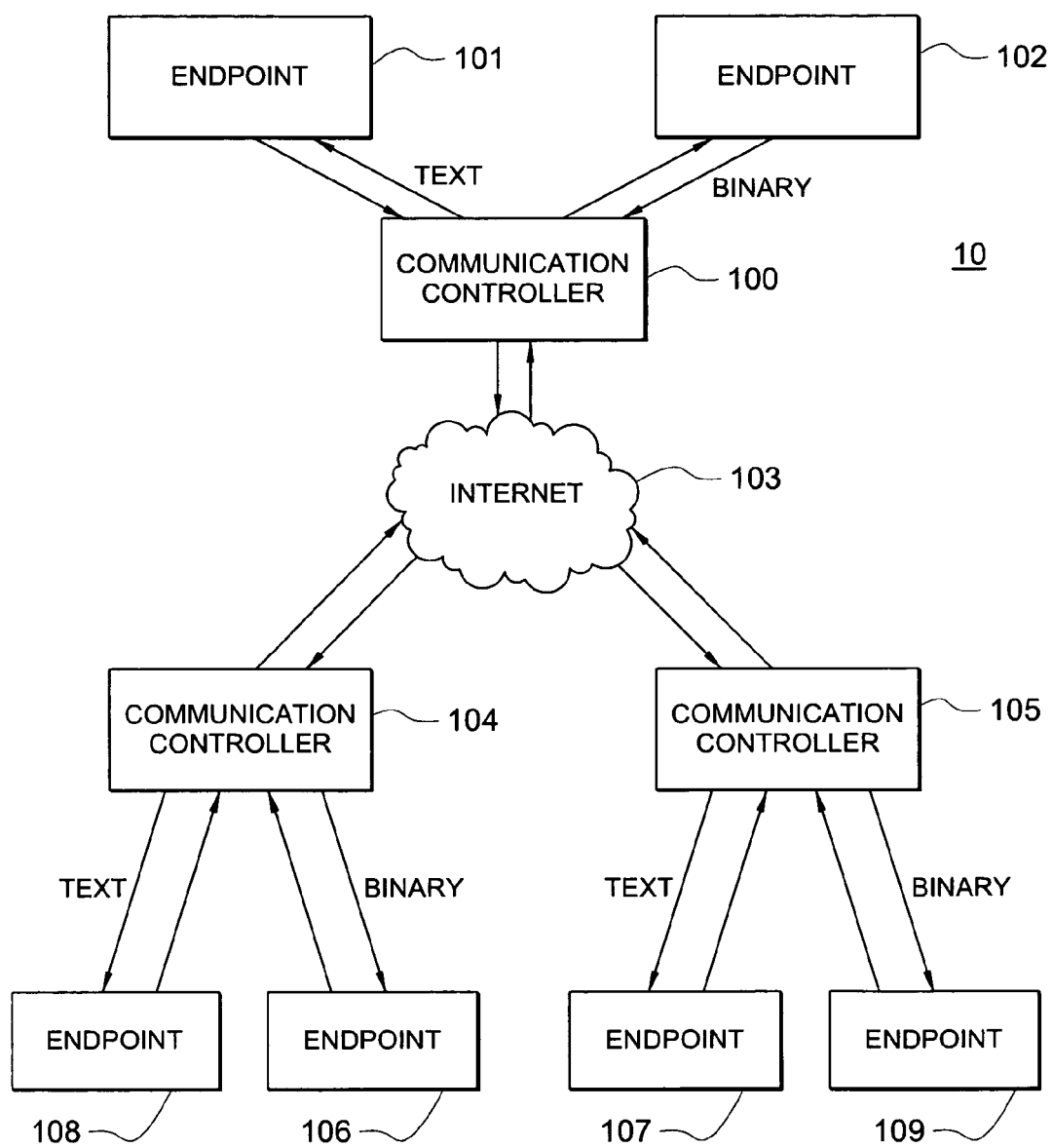
FIG. 1B is a block diagram illustrating the multimedia communication network of FIG. 1A in an alternative connection.

FIG. 1B is a block diagram illustrating multimedia communication network 10 in an alternative connection session. As described in FIG. 1A, communication from endpoints 101 and 102 are converted from a text-base protocol and a binary protocol (respectively), into the interim or intermediate protocol which is then transmitted to the destination endpoints.

In the connection illustrated in FIG. 1B, more endpoints, endpoints 108 and 109, are connected into multimedia communication network 10 though communication controllers 104 and 105. Endpoint 108, connected to communication controller 104, communicates using a text-based protocol, which is different that the binary protocol used by endpoint 106. Similarly, endpoint 109 communicates using a binary protocol, which is different from the text-based protocol of endpoint 107, both of which are connected into communication controller 105. The various embodiments of the present invention allow any of the endpoints connected into a communication controller to transmit its multimedia communication data in various, incompatible protocols. In this manner, the intermediate protocol data stream arriving at communication controller 104 will be converted into a text-based protocol for delivery to endpoint 108, and will also be converted into a binary protocol for delivery to endpoint 106. Thus, the protocol of the endpoint does not limit the communication within multimedia communication network 10.

Figure 2:
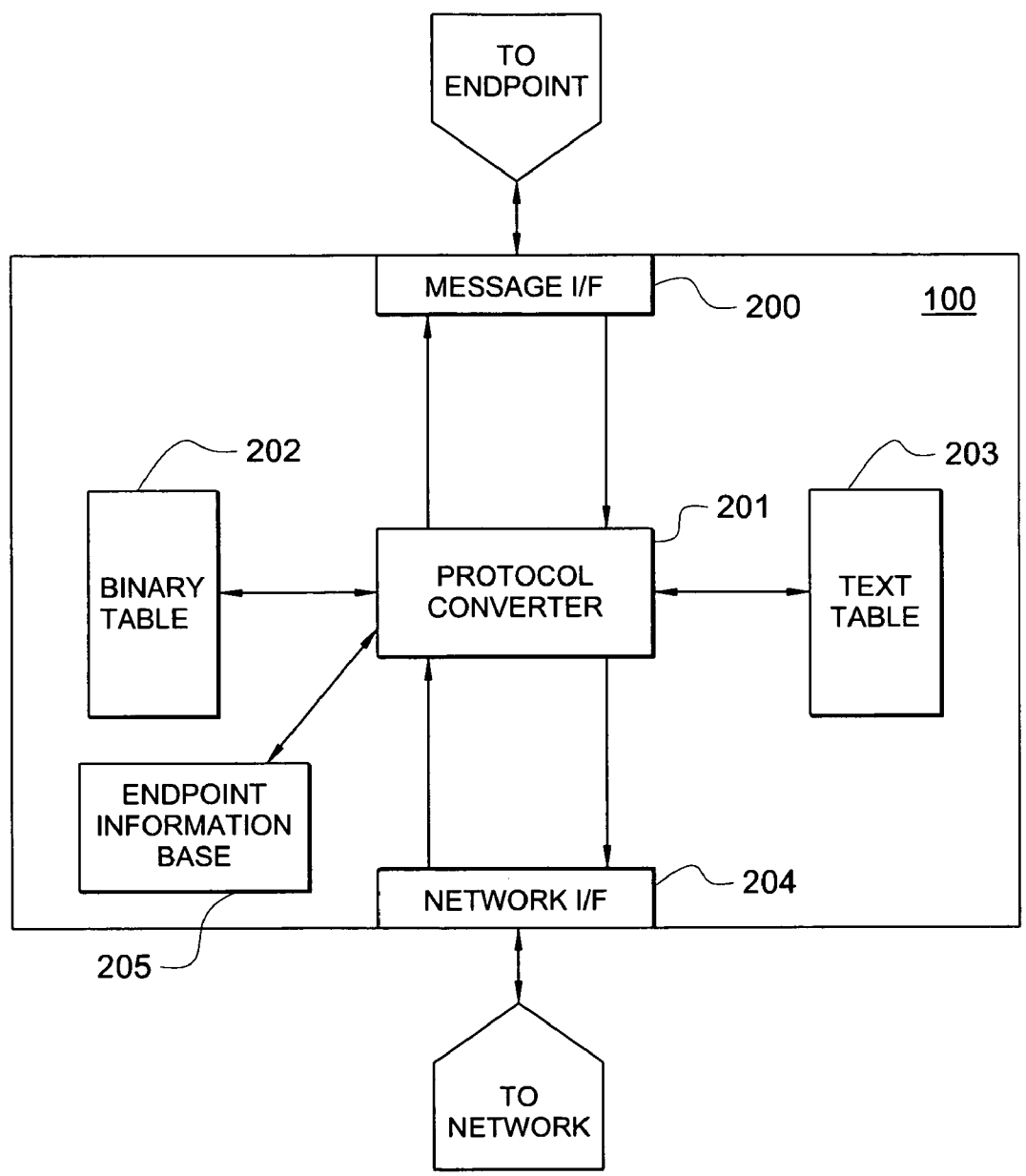
FIG. 2 is a detailed block diagram illustrating component blocks of a communication controller.

FIG. 2 is a detailed block diagram illustrating component blocks of communication controller 100. When initiating multimedia communications, an endpoint transmits the multimedia data streams to communication controller 100 in the communication protocol that it was configured for. Communication controller 100 receives the data streams at message interface 200. Message interface 200 sends the data stream to protocol converter 201. Protocol converter 201 examines the data stream and first determines what protocol the data stream has been configured for. With this information, protocol converter 201 begins examining the data stream packets to find protocol messages or commands contained within the data stream. As such protocol messages or commands are found, protocol converter 201 accesses a corresponding table to find the interim protocol message to replace the original message.

In the example depicted in FIG. 2, protocol converter 201 may access binary table 202, when the received multimedia data stream is in a binary format protocol, or it may access text table 203, when the received multimedia data stream is in a text-based protocol. For purposes of this example, the endpoint is transmitting a data stream in a text-based protocol. Therefore, protocol converter 201 accesses text table 203 when it discovers messages or commands in the text-based protocol. Protocol converter 201 searches through text table 203 for messages or commands in the interim protocol that correspond to the message or command discovered in the original, text-based protocol. Protocol converter 201 begins translating the data stream line-by-line into a new, interim data stream by retrieving the associated message or command in the interim protocol from text table 203 and packaging the payload or data from the original data stream along with the message or command in the interim protocol.

As protocol converter 201 assembles the new data stream in the interim protocol, the stream is forwarded to network interface 204 for transmission of the translated data stream onto the network. The translated interim data stream will be addressed to any of the target endpoints by way of any intervening communication controllers.

Protocol converter 100 also works in reverse upon the receipt of a communication data stream from the network. The data stream is received at network interface 204 in the interim protocol. Network interface 204 sends the data stream to protocol converter 201. As a part of the interim data stream, the address of the target endpoint is included in the stream administrative data. Protocol converter 201 parses this administrative data from the stream and locates information on the target endpoint by accessing endpoint information base 205. Endpoint information base 205 maintains records of the capabilities and compatibilities of each of the endpoints connected to communication controller 100. One such capability is the type of communication protocol that the target endpoint speaks. With this information, protocol converter 201 accesses either binary table 202 or text table 203, depending on which protocol the endpoint understands. Protocol converter 201 then begins scanning the interim data stream for the commands and messages in the interim protocol.

For purposes of this example, the target endpoint uses a binary formatted protocol. Therefore, protocol converter 201 accesses binary table 202 and locates the binary protocol messages or commands that correspond to the interim protocol and begins re-packaging the transferred data into a multimedia data stream in the binary protocol. As the new, re-packaged multimedia data stream is being assembled, protocol converter transmits the stream to message interface 200 addressed to the appropriate endpoint attached to communication controller 100. By performing these conversions in real-time from an efficient interim protocol, the multimedia communication system configured according to an embodiment of the present invention is able to facilitate communication between multiple endpoints even though those endpoints are not configured to receive the same communication protocol. Moreover, because an interim protocol is used to transmit the data stream between protocol converters in the network, the conversion to the ultimate communication protocol at the protocol converter connected to the target endpoint, thus, improving the conversion speed and efficiency of the communication.

Figure 3:
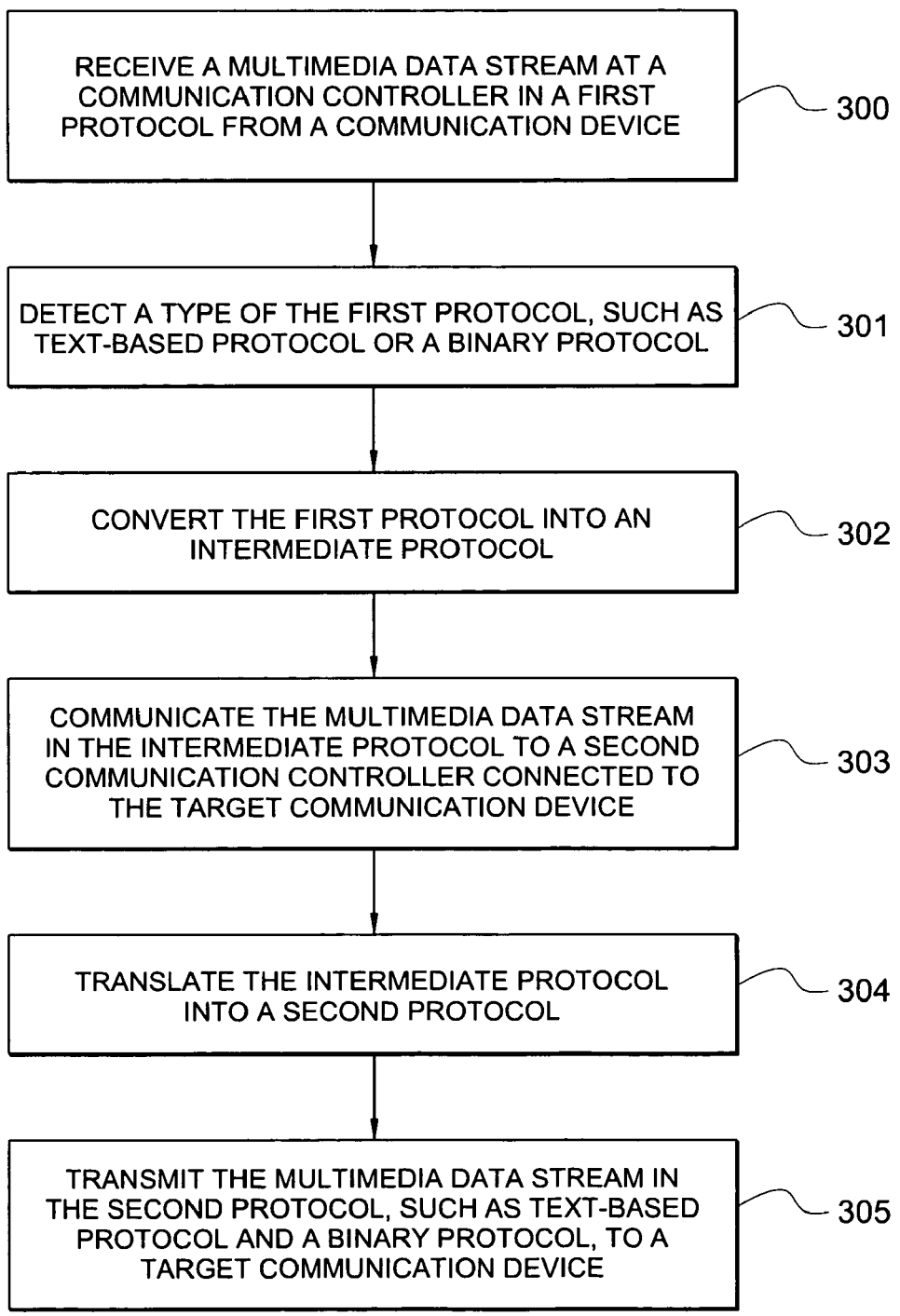
FIG. 3 is a flowchart illustrating example steps executed to implement one embodiment of the present invention.

FIG. 3 is a flowchart illustrating example steps executed to implement one embodiment of the present invention. In step 300, a multimedia data stream is received from a communication device at a communication controller in a first protocol. In step 301, a type of the first protocol, such as text-based protocol or a binary protocol, is detected. The first protocol is converted into an intermediate protocol in step 302. The multimedia data stream in the intermediate protocol is communicated, in step 303, to a second communication controller connected to the target communication device. The intermediate protocol is translated into a second protocol in step 304. In step 305, the multimedia data stream in the second protocol, such as text-based protocol and a binary protocol, is transmitted to a target communication device.

Figure 4:
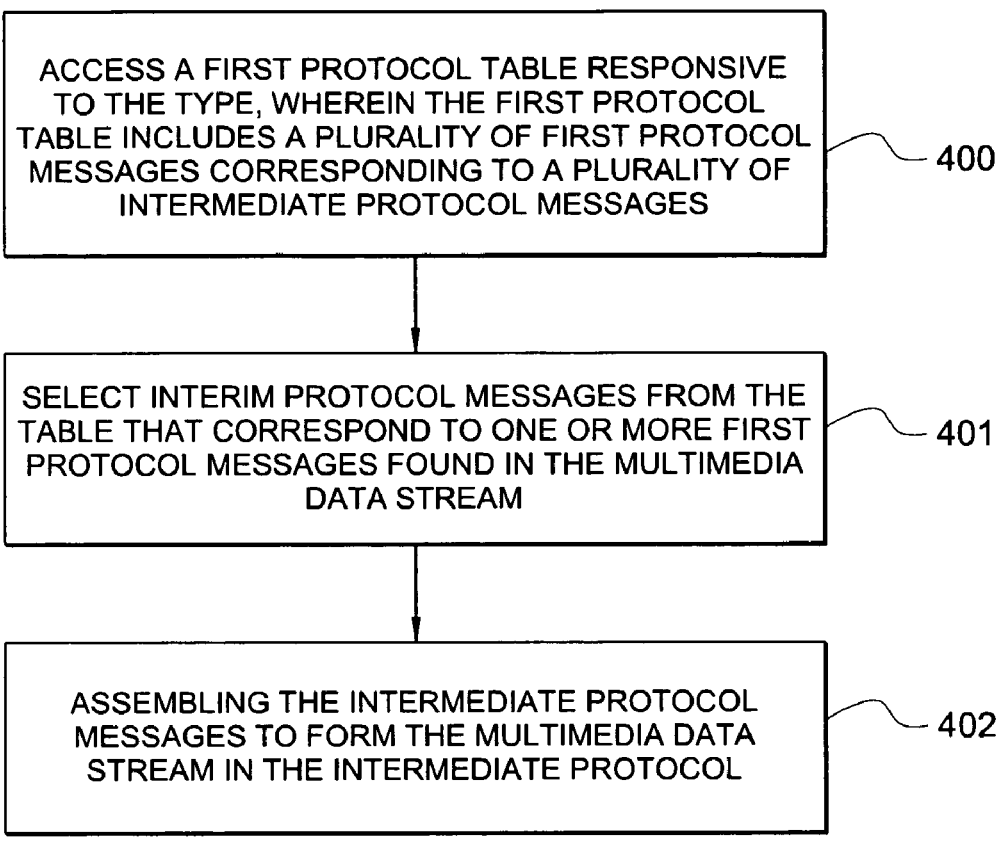
FIG. 4 is a flowchart illustrating example steps executed to convert a first protocol into an intermediate protocol in a multimedia communication system configured according to one embodiment of the present invention.

In converting a first protocol into the interim or intermediate protocol, steps are executed to translate the protocol of the data stream line-by-line or bit-by-bit. FIG. 4 is a flowchart illustrating example steps executed to convert a first protocol into an intermediate protocol according to one embodiment of the present invention. In step 400, a first protocol table is accessed responsive to the type of protocol detected. The first protocol table includes first protocol messages and shows the corresponding intermediate protocol messages. Interim protocol messages are selected, in step 401, from the table that correspond to the first protocol messages in the multimedia data stream. In step 402, the intermediate protocol messages are assembled to form the multimedia data stream in the intermediate protocol. The assembled message is then transmitted onto the network for communication.

Figure 5:
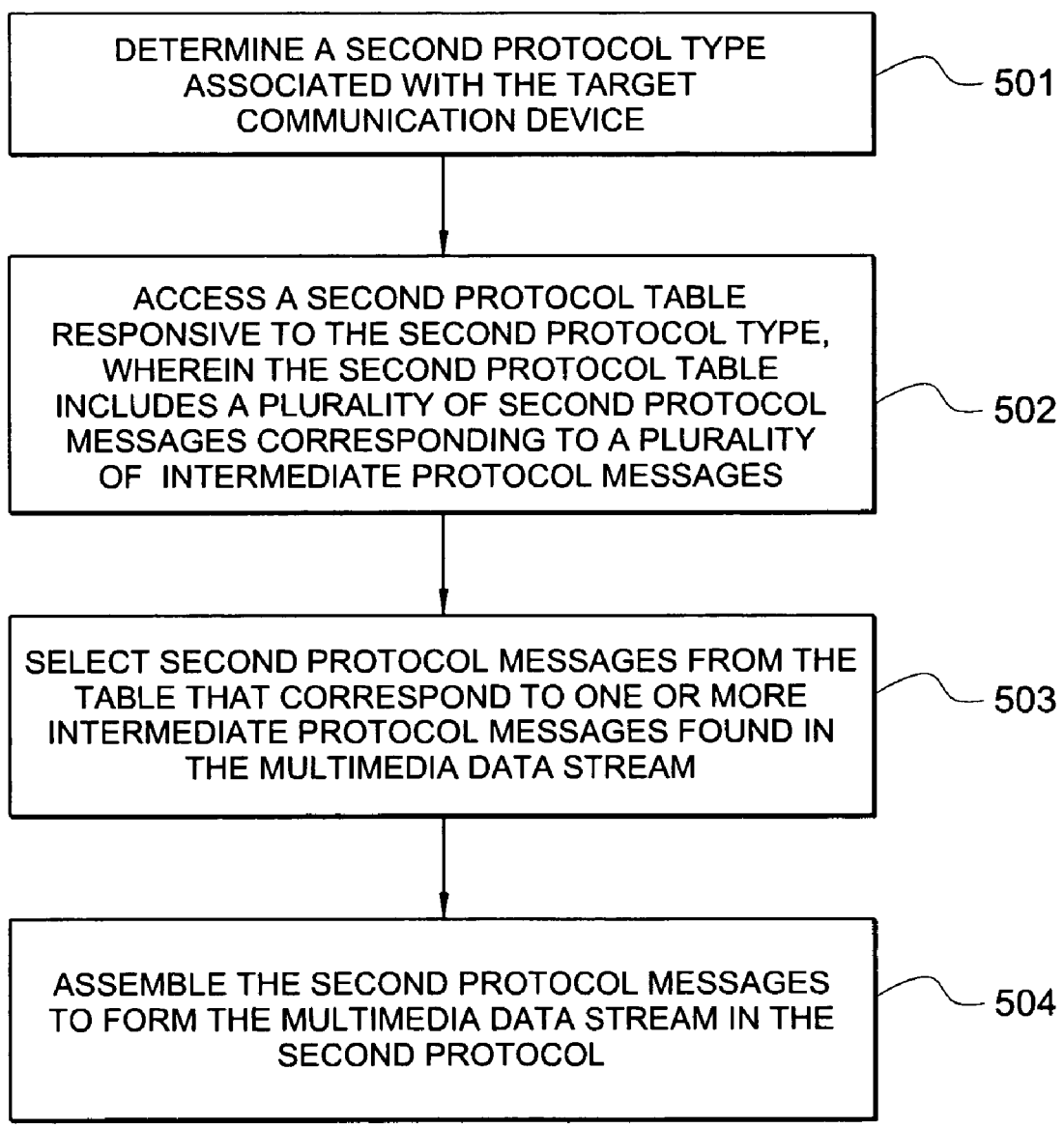
FIG. 5 is a flowchart illustrating example steps executed to convert an intermediate protocol into a second protocol in a multimedia communication system configured according to one embodiment of the present invention.

The multimedia data stream received in the interim or intermediate protocol is also converted line-by-line or bit-by-bit into the protocol appropriate for the target or destination endpoint or communication device. FIG. 5 is a flowchart illustrating example steps executed to convert an intermediate protocol into a second protocol in a multimedia communication system configured according to one embodiment of the present invention. In step 500, a second protocol type associated with the target communication device is determined. A second protocol table is accessed in step 501 responsive to determination of the second protocol type. The second protocol table includes second protocol messages shown with their corresponding intermediate protocol messages. In step 502, second protocol messages are selected from the table that correspond to the intermediate protocol messages found in the multimedia data stream. The second protocol messages are assembled, in step 503, to form the multimedia data stream in the second protocol, which is then forwarded to the destination endpoint or communication device for delivery.

It should be noted that the various embodiments of the present invention are directed to multimedia communication systems. Multimedia communication systems include such multi-format data such as voice and video; voice, video, and data; and the like. Systems that are purely intended to transfer data only, or voice only, may benefit from the techniques described herein. However, the complexities of dealing with the multiple data types in multimedia systems along with the multiple protocols designed for such systems resolves a growing problem which has yet to be addressed in technology.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. It may also include fixed or reprogrammable ROM used as firmware for various hardware devices. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
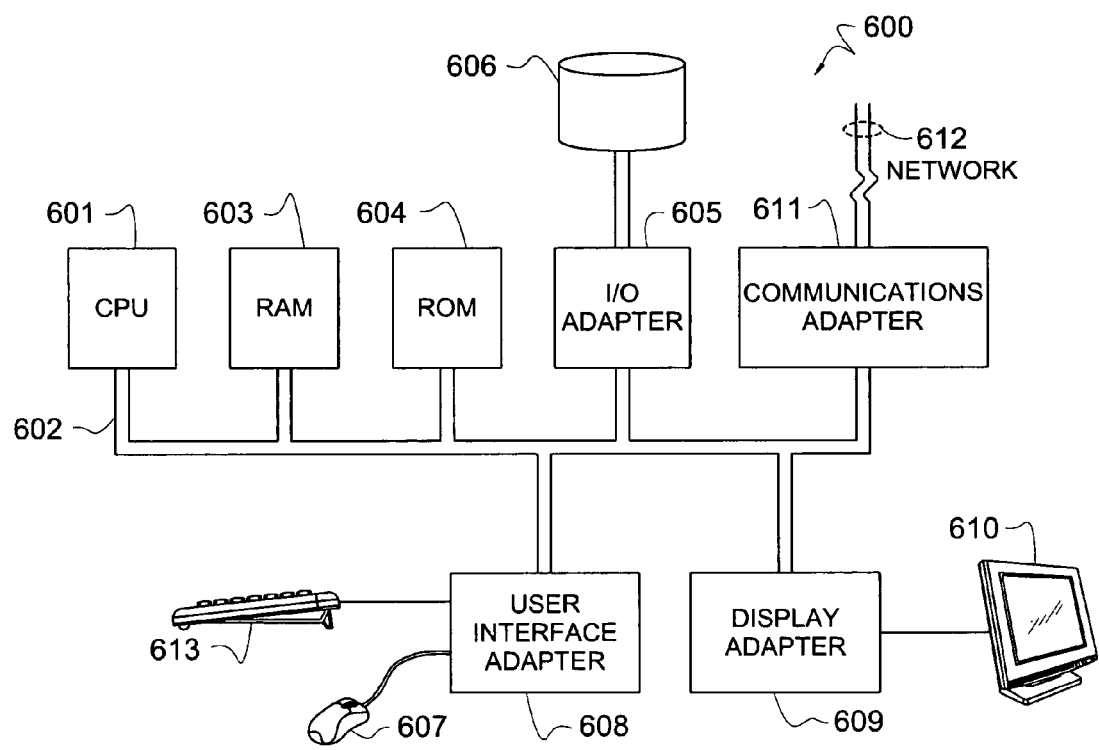
FIG. 6 illustrates a computer system adapted to use embodiments of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, and the like, to the computer system 600. The display card 609 is driven by CPU 601 to control the display on display device 610.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for multimedia communication comprising:
   receiving a multimedia data stream at a communication controller in a first protocol from a communication device, wherein the first protocol comprises a signaling protocol;
   detecting a type of said first protocol;
   converting said first protocol into an intermediate protocol;
   translating said intermediate protocol into a second protocol, wherein the second protocol comprises a signaling protocol; and
   transmitting said multimedia data stream in said second protocol to a target communication device;
   wherein said first protocol comprises one of a text-based protocol and a binary protocol and wherein said second protocol comprises one of a binary protocol and a text-based protocol.

2. The method of claim 1 further comprising:
   communicating, prior to said translating, said multimedia data stream in said communication controller to a second communication controller connected to said target communication device; wherein said translating and said transmitting are performed by said second communication controller.

3. The method of claim 1 wherein said converting comprises:
   accessing a first protocol table responsive to said type, wherein said first protocol table includes a plurality of first protocol messages corresponding to a plurality of intermediate protocol messages;
   selecting ones of said plurality of intermediate protocol messages that correspond to one or more first protocol messages found in said multimedia data stream; and
   assembling said ones of said plurality of intermediate protocol messages to form said multimedia data stream in said intermediate protocol.

4. The method of claim 1 wherein said translating comprises:
   determining a second protocol type associated with said target communication device;
   accessing a second protocol table responsive to said second protocol type, wherein said second protocol table includes a plurality of second protocol messages corresponding to said plurality of intermediate protocol messages;
   selecting ones of said plurality of second protocol messages that correspond to one or more intermediate protocol messages found in said multimedia data stream; and
   assembling said ones of said plurality of second protocol messages to form said multimedia data stream in said second protocol.

5. The method of claim 4 further comprising:
   retrieving said second protocol type from a device information base, wherein said device information base contains compatibility information for each device available for said multimedia communication.

6. The method of claim 1 wherein said intermediate protocol comprises protocol messages common to said text-based protocol and said binary protocol.

7. A communication controller in a multimedia communication system, said communication controller comprising:
   a message interface to transceive multimedia data from a communication endpoint in a first protocol, wherein the first protocol comprises a signaling protocol, and wherein said first protocol is either a text-based protocol or a binary protocol;
   a protocol signaler to determine a type of said first protocol;
   a first protocol conversion table that contains a plurality of first protocol messages and a plurality of interim protocol messages, wherein said plurality of interim protocol messages correspond to ones of said plurality of first protocol messages;
   a protocol conversion utility to convert said first protocol into an interim protocol using said first protocol conversion table; and
   a network interface to transceive said multimedia data in said interim protocol to a target communication endpoint.

8. The communication controller of claim 7 wherein said protocol conversion utility converts said interim protocol of a received multimedia data stream into a second protocol and wherein said message interface transmits said received multimedia data stream in said second protocol to a destination endpoint connected to said communication controller.

9. The communication controller of claim 8 further comprising:
   a second protocol conversion table that contains a plurality of second protocol messages and said plurality of interim protocol messages, wherein said plurality of interim protocol messages correspond to ones of said plurality of second protocol messages.

10. The communication controller of claim 8 further comprising:
    an endpoint information base including compatibility data on one or more communication endpoints connected to said communication controller, wherein said compatibility data includes a device protocol type.

11. A method for multimedia communication comprising:
    receiving a multimedia data stream at a communication controller in a first protocol from a communication device;
    detecting a type of said first protocol;
    converting said first protocol into an intermediate protocol, wherein said converting is performed irrespective of a second protocol in which the multimedia data stream is to be transmitted to a target communication device;
    translating said intermediate protocol into said second protocol; and transmitting said multimedia data stream in said second protocol to the target communication device;

wherein said first protocol comprises one of a text-based protocol and a binary protocol and wherein said second protocol comprises one of a binary protocol and a text-based protocol.

12. The method of claim 11 further comprising:

communicating, prior to said translating, said multimedia data stream in said communication controller to a second communication controller connected to said target communication device; wherein said translating and said transmitting are performed by said second communication controller.

13. The method of claim 11 wherein said converting comprises:

accessing a first protocol table responsive to said type, wherein said first protocol table includes a plurality of first protocol messages corresponding to a plurality of intermediate protocol messages;

selecting ones of said plurality of intermediate protocol messages that correspond to one or more first protocol messages found in said multimedia data stream; and assembling said ones of said plurality of intermediate protocol messages to form said multimedia data stream in said intermediate protocol.

14. The method of claim 11 wherein said translating comprises:

determining a second protocol type associated with said target communication device;

accessing a second protocol table responsive to said second protocol type, wherein said second protocol table includes a plurality of second protocol messages corresponding to said plurality of intermediate protocol messages;

selecting ones of said plurality of second protocol messages that correspond to one or more intermediate protocol messages found in said multimedia data stream; and assembling said ones of said plurality of second protocol messages to form said multimedia data stream in said second protocol.

15. The method of claim 14 further comprising:

retrieving said second protocol type from a device information base, wherein said device information base contains compatibility information for each device available for said multimedia communication.

16. The method of claim 11 wherein said intermediate protocol comprises protocol messages common to said text-based protocol and said binary protocol.

17. The method of claim 11 wherein said first protocol comprises a signaling protocol, and wherein said second protocol comprises a signaling protocol.

18. A computer program product having a computer readable storage medium with computer program logic recorded thereon for multimedia communication, said computer program product comprising:

code for receiving a multimedia data stream at a communication controller in a first protocol from a communication device;

code for detecting a type of said first protocol;

code for converting said first protocol into an intermediate protocol, wherein said converting is performed irrespective of a second protocol in which the multimedia data stream is to be transmitted to a target communication device;

code for translating said intermediate protocol into the second protocol; and code for transmitting said multimedia data stream in said second protocol to the target communication device;

wherein said first protocol comprises one of a text-based protocol and a binary protocol and wherein said second protocol comprises one of a binary protocol and a text-based protocol.

19. The computer program product of claim 18 further comprising:

code for communicating, prior to execution of said code for translating, said multimedia data stream in said communication controller to a second communication controller connected to said target communication device; wherein said code for translating and said code for transmitting are executed at said second communication controller.

20. The computer program product of claim 18 wherein said code for converting comprises:

code for accessing a first protocol table responsive to said type, wherein said first protocol table includes a plurality of first protocol messages corresponding to a plurality of intermediate protocol messages;

code for selecting ones of said plurality of intermediate protocol messages that correspond to one or more first protocol messages found in said multimedia data stream; and code for assembling said ones of said plurality of intermediate protocol messages to form said multimedia data stream in said intermediate protocol.

21. The computer program product of claim 18 wherein said code for translating comprises:

code for determining a second protocol type associated with said target communication device;

code for accessing a second protocol table responsive to said second protocol type, wherein said second protocol table includes a plurality of second protocol messages corresponding to said plurality of intermediate protocol messages;

code for selecting ones of said plurality of second protocol messages that correspond to one or more intermediate protocol messages found in said multimedia data stream; and code for assembling said ones of said plurality of second protocol messages to form said multimedia data stream in said second protocol.

22. The computer program product of claim 21 further comprising:

code for retrieving said second protocol type from a device information base, wherein said device information base contains compatibility information for each device available for said multimedia communication.

23. The computer program product of claim 18 wherein said intermediate protocol comprises protocol messages common to said text-based protocol and said binary protocol.

* * * * *